(12) United States Patent
Alnås

(10) Patent No.: US 8,438,246 B2
(45) Date of Patent: May 7, 2013

(54) DEVICE MANAGEMENT USING A RESTFUL INTERFACE

(75) Inventor: Svante Alnås, Lund (SE)

(73) Assignee: Sony Mobile Communications AB, Lund (SE)

( * ) Notice: Subject to any disclaimer, the term of this patent is extended or adjusted under 35 U.S.C. 154(b) by 133 days.

(21) Appl. No.: 12/882,238

(22) Filed: Sep. 15, 2010

(65) Prior Publication Data

US 2012/0066348 A1    Mar. 15, 2012

(51) Int. Cl.
  G06F 15/16    (2006.01)
  G06F 15/177    (2006.01)
  G06F 15/173    (2006.01)

(52) U.S. Cl.
  USPC ............ 709/219; 709/203; 709/221; 709/222

(58) Field of Classification Search ................... 709/219, 709/217, 218, 248, 203, 220–224, 227–229
See application file for complete search history.

(56) References Cited

U.S. PATENT DOCUMENTS

| | | |
|---|---|---|
| 2007/0130286 A1 | 6/2007 | Hopmann et al. |
| 2008/0052384 A1 | 2/2008 | Marl et al. |
| 2009/0228606 A1* | 9/2009 | McCarthy et al. ............. 709/248 |
| 2009/0252159 A1* | 10/2009 | Lawson et al. ................ 370/352 |
| 2009/0318168 A1* | 12/2009 | Khosravy et al. .......... 455/456.3 |
| 2011/0010383 A1* | 1/2011 | Thompson et al. ........... 707/769 |
| 2011/0296011 A1* | 12/2011 | Dare et al. .................... 709/224 |

FOREIGN PATENT DOCUMENTS

WO    2009133544 A1    11/2009

OTHER PUBLICATIONS

Hanson, "Writing REST Services," Dec. 2007, IBM, www.ibm.com/developerworks/xml/tutorials/x-restatompp/x-restatompp-pdf.pdf.*
Fielding, R. T., "Architectural Styles and the Design of Network-based Software Architectures", Dissertation submitted in partial satisfaction of the requirements for the degree of Doctor of Philosophy in Information and Computer Science, Dec. 31, 2000, pp. 1-162, XP002666193.
Griffin, K., et al., "Representational State Transfer (REST) for Feature Configuration in Session Initiation Protocol (SIP)", Bliss, Internet-Draft, Oct. 27, 2008, pp. 1-11, XP002666194.
European Search Report issued Jan. 4, 2012 in re EP Application No. 11006648.7.

* cited by examiner

*Primary Examiner* — Ruolei Zong
(74) *Attorney, Agent, or Firm* — Coats & Bennett, P.L.L.C.

(57) ABSTRACT

A Device Management system includes a device management server used by a network operator to manage one or more mobile devices operating in a wireless communications network. The device management server provides the mobile devices with Representational State Transfer (REST) commands to be executed by the mobile devices. The REST commands identify a location of one or more files on a network server that, when executed by the mobile devices, allows the devices to retrieve the files from the server, or directly from a data storage system accessible to the mobile device. The device management server may also provide the mobile devices with REST commands that allow the mobile devices to upload and store their files and information onto the network server at the specified location.

24 Claims, 6 Drawing Sheets

DEVICE MANAGEMENT USING A RESTFUL INTERFACE

FIELD OF THE INVENTION

The present invention relates generally to device management operations, and particularly to device management of wireless communications devices.

BACKGROUND

Device Management (DM) systems facilitate the remote management of mobile devices over an air interface. For example, using a DM system, a network operator can update the settings, the firmware, or the Operating System (OS) of a given managed device, or install applications on the managed device. To perform such operations, a network operator interacts with a DM server via a DM interface. With this interface, the network operator can cause the DM server to dynamically generate a document (e.g., an XML document) that contains the needed update information for the managed device, and then send that document to the managed device via an air interface. Upon receiving the information and data from the DM server, the managed device installs the update.

Using DM systems, network operators are able to manage a large number of devices. This frees end users from having to bring their devices, such as cellular telephones, for example, to a centralized location or other service center to periodically refresh or update their software, or to have software bugs corrected. However, although conventional DM systems negate the need for users to make such trips, conventional DM systems still require large amounts of overhead and utilize large amounts of resources when performing their operations.

SUMMARY

The present invention utilizes Representational State Transfer (REST) on a device management system, such an Open Mobile Alliance (OMA) Device Management (DM) system, to perform device management control over one or more managed devices. In one embodiment, the present invention provides a method of managing mobile devices in a wireless communication network, the method comprising establishing a device management (DM) communication session with a mobile device, generating, at a device management server, a Representational State Transfer (REST) command for execution at the mobile device, the REST command comprising a data command that, when executed by the mobile device, allows the mobile device to communicate device data associated with the mobile device with a network server, and sending the REST command from the device management server to the mobile device via a first communication channel associated with the DM session.

In one embodiment, generating a REST command comprises generating a REST update command to be executed by the mobile device to upload and store the device data associated with the mobile device onto the network server over a second communication channel.

In one embodiment, generating a REST command comprises generating a REST retrieve command to be executed by the mobile device to retrieve the device data associated with the mobile device from the network server over a second communication channel.

In one embodiment, generating a REST command comprises generating the REST command to include a first Uniform Resource indicator (URI) that identifies a location on the network server having the device data associated with the mobile device.

In one embodiment, generating the REST command comprises generating the REST command to further include a second URI identifying a location on the mobile device to store the device data retrieved from the first URI.

In one embodiment, the method further comprises generating the first URI to include one or more parameters to be replaced by the mobile device prior to the mobile device executing the REST command.

In one embodiment, the device data associated with the mobile device comprises configuration information for the mobile device.

In one embodiment, establishing the DM communication session with the mobile device comprises establishing the session responsive to detecting a trigger condition associated with the mobile device.

The present invention also provides a device management server for managing mobile devices in a wireless communication network. In one embodiment, the server comprises memory to store a Device Management (DM) agent, and a controller. The controller may be configured to execute the DM agent to establish a DM communication session with a mobile device, generate a Representational State Transfer (REST) command for execution at the mobile device, the REST command comprising a data command that, when executed by the mobile device, allows the mobile device to communicate device data associated with the mobile device with a network server, and send the REST command to the mobile device over a first communication channel via a first communication channel associated with the established DM session.

In one embodiment, the generated REST command comprises a REST update command to be executed by the mobile device to upload and store the device data associated with the mobile device onto the network server over a second communication channel.

In one embodiment, the generated REST command comprises a REST retrieve command to be executed by the mobile device to retrieve the device data associated with the mobile device from the network server over a second communication channel.

In one embodiment, the controller is configured to generate the REST command to include a first Uniform Resource Indicator (URI) that identifies a location on the network server where the device data associated with the mobile device is stored.

In one embodiment, the controller is configured to generate the REST command to include a second URI that identifies a location on the mobile device to store the device data retrieved from the first URI.

In one embodiment, the controller is configured to generate the first URI to include one or more parameters to be replaced by the mobile device prior to the mobile device executing the REST command.

In one embodiment, the device associated with the mobile device comprises configuration information for the mobile device.

In one embodiment, the controller is configured to establish the DM communication session with the mobile device responsive to detecting an error condition associated with the mobile device.

In one embodiment, the DM agent comprises an Open Mobile Alliance (OMA) DM server agent.

In one embodiment, the server and the network server comprise a single node.

The present invention also provides a method for managing mobile devices in a wireless communication network. In one embodiment, the method comprises establishing a Device Management (DM) communication session between a mobile device and a device management server, receiving a Representational State Transfer (REST) command from the device management server via a first communication channel associated with the DM communication session, and executing the REST command at the mobile device to communicate device data associated with the mobile device with a network server.

In one embodiment, receiving and executing the REST command comprises receiving, at the mobile device, a REST update command over the first communication channel, and executing the REST update command at the mobile device to upload and store the device data to the network server over a second communication channel.

In one embodiment, receiving and executing the REST command comprises receiving, at the mobile device, a REST retrieve command over the first communication channel, and executing the REST retrieve command at the mobile device to retrieve the device data from the network server over a second communication channel.

In one embodiment, the REST command received from the device management server comprises a first Uniform Resource indicator (URI) that identifies a location for the device data on the network server.

In one embodiment, the REST command received from the device management server further comprises a second URI that identifies a location on the mobile device to store the device data retrieved from the first URI.

In one embodiment, the method further comprises replacing one or more parameters in the first URI at the mobile device with values prior to executing the REST update command.

In one embodiment, the device data associated with the mobile device comprises configuration information for the mobile device.

In one embodiment, establishing the DM communication session comprises initiating communications with the data management server to establish the DM communication session.

The present invention also provides a mobile device in a wireless communications network. In one embodiment, the mobile device comprises a transceiver configured to establish a Device Management (DM) session with a device management server, and a controller. The controller is configured to receive a Representational State Transfer (REST) command from the device management server via a first communication channel associated with the DM session, and execute the REST command to communicate device data associated with the mobile device with a network server over a second communication channel.

In one embodiment, the controller is configured to receive a REST update command from the device management server over the first communication channel, and execute the REST update command to upload and store the device data associated with the mobile device over the second communication channel to the network server.

In one embodiment, the controller is configured to receive a REST retrieve command from the device management server over the first communication channel, and execute the REST retrieve command to retrieve the device data associated with the mobile device over the second communication channel from the network server.

In one embodiment, the received REST command comprises a first Uniform Resource indicator (URI) that identifies a location for the device data on the network server.

In one embodiment, the received REST command further comprises a second URI that identifies a location for the device data on the mobile device.

In one embodiment, the controller is further configured to replace one or more parameters in the first URI with values prior to executing the REST command.

In one embodiment, the device data associated with the mobile device comprises configuration information for the mobile device.

In one embodiment, the controller is further configured to initiate establishing the DM communication session.

DETAILED DESCRIPTION

The present invention utilizes Representational State Transfer (REST) on a device management system, such an Open Mobile Alliance (OMA) Device Management (DM) system, to perform device management control over one or more managed devices. As is known in the art, REST is used for designing networked applications. Particularly, rather than using complex mechanisms such as CORBA, RPC, and SOAP to connect between machines, REST uses simple HTTP to make calls between machines.

According to the present invention, a device management server establishes a DM communication session to communicate information and data with a managed device. Rather than simply provide the managed device with the information and data, as is conventional, the device management server of the present invention generates REST commands and sends them to the managed device. Upon receipt of the REST commands, the managed device executes the commands to store and/or retrieve static and/or dynamic data and information associated with the managed device to/from a network server.

In one embodiment, the device management server generates a REST update command (e.g., a HTTP/HTTPS PUT or POST command) for the managed device, and sends the command to the managed device. The managed device then executes the received REST update command to upload the device data onto the network server for storage. The device data uploaded to the server may comprise, for example, static information such as configuration information or settings for the mobile device. When the device management server detects an error condition at the managed device, such as a configuration error, the device management server generates and sends a REST retrieve command (e.g., a HTTP/HTTPS GET command) to the mobile device. Upon receiving the command, the managed device executes the REST retrieve command to retrieve the stored settings from the network server. The managed device can then update its own copy of the settings with those retrieved from the network server.

Expanding a DM system to utilize RESTful commands provides benefits that conventional DM systems are not able to provide. Particularly, the prior art DM systems typically provide device data to a managed device whenever it detects, for example, that the managed device needs such information. However, this requires quite a bit of overhead and resources. The present invention deviates from such conventional systems in that it provides the managed devices with a smaller, more manageable REST command (e.g., HTTP/HTTPS PUT, GET, etc.) to enable the managed devices to interact directly with the network server that stores the device data. Thus, by integrating REST commands into a DM system, network operators are able to perform DM control functions using less overhead and resources than are used by conventional DM systems.

Figure 1:
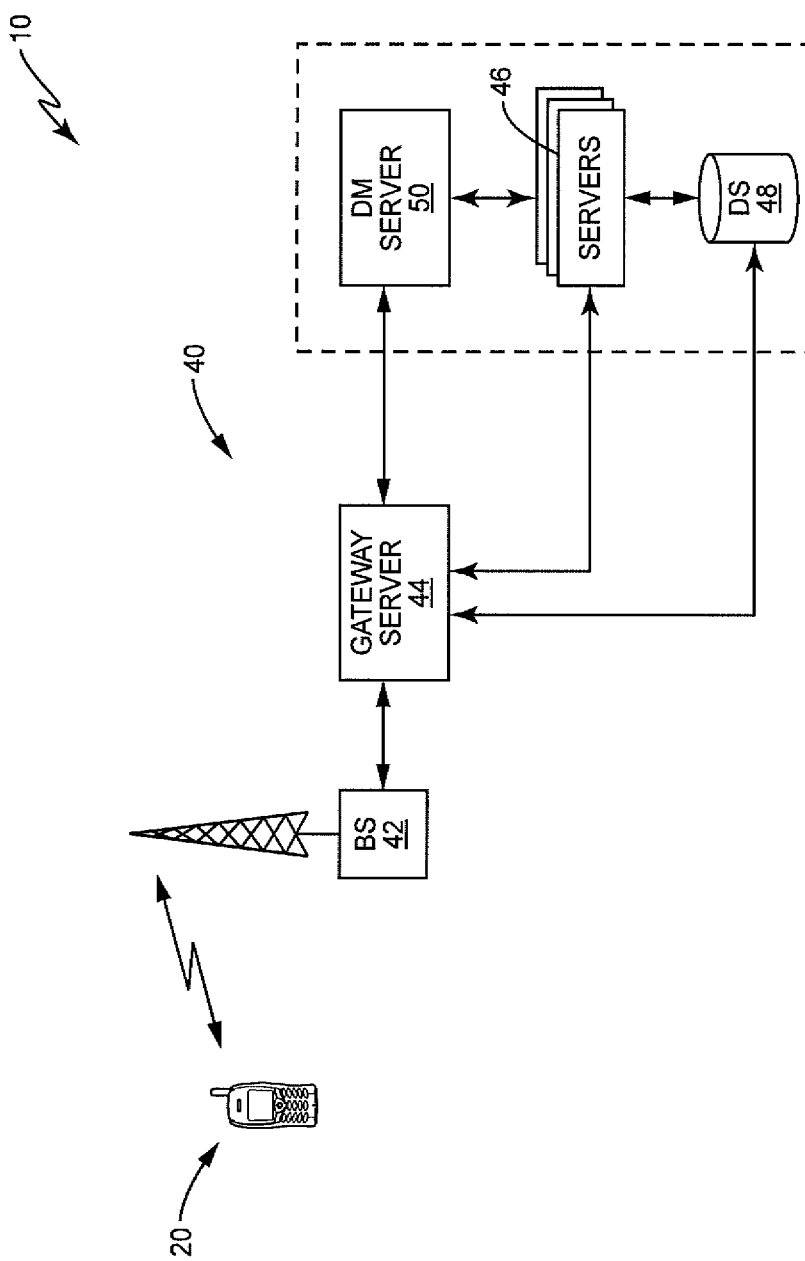
FIG. 1 is a block diagram illustrating a network configuration suitable for use in one embodiment of the present invention.

Turning now to the figures, FIG. 1 is a block diagram illustrating some of the components of a communications system 10 configured to function according to one embodiment of the present invention. Those of ordinary skill in the art will readily appreciate that the components and their configuration shown in FIG. 1 are for illustrative purposes only, and that it is possible to use the present invention with systems having other components and network configurations.

System 10 comprises a managed device, which in FIG. 1 is illustrated as a mobile device 20, and a communications network 40. The network 40 comprises one or more Base Stations (BS) 42, a Gateway (GW) server 44, one or more network servers 46 connected to a data storage (DS) 48, and a Device Management (DM) server 50. It should be noted here that while the servers 46, the DS 48, and the DM server 50 are illustrated as separate interconnected nodes, this is for illustrative purposes only. These nodes may be separate from each other, each performing their own functions and communicatively interconnected with each other. However, the present invention does not require this architecture. In at least one embodiment, the server(s) 46, the DS 48, and the DM server 50 may comprise a single node in network 40. In such cases, these nodes could be referred to collectively as "DM server" or "DM server backend," for example.

The one or more Base Stations (BS) 42 connect to corresponding antennas, which may be fixed-site antenna towers, for example. As is known in the art, each BS 42 provides radio coverage for the mobile devices 20 over a limited area referred to as a cell. BS 42 may operate according to any known standard to allow a user of mobile device 20 to communicate voice and/or data to one or more remote parties. Such standards include, but are not limited to, the standards known generally as the Global System for Mobile Communications (GSM), cdma2000, Universal Mobile Telecommunications System (UMTS), Wideband Code Division Multiple Access (CDMA), 3GPP Long Term Evolution (LTE), and Worldwide Interoperability for Microwave Access (WiMAX).

The BS 42 also connects to a Gateway (GW) server 44. The GW server 44 may be used for device management functions and is typically disposed between the BS 42, the DM server 50, and the servers 46. The GW server 44 supports the network communications and the device management communications between the mobile device 20 and the DM server 50, as well as the communications between the mobile device 20 and the one or more servers 46, and/or the DS 48. Additionally, in some embodiments, the GW server 44 provides other services as well. For example, the GW server 44 could provide authentication services to ensure that mobile device 20 is an authorized device. The GW server 44 may also allocate IP addresses to the mobile devices 20 to support procedures that update software applications, firmware, and/or settings on mobile device 20. An example of such an update operation in the context of the present invention is when the DM server 50 "pushes" a command to the mobile device 20 that causes the device 20 to upgrade the software, firmware, and/or settings using data stored on server 46 and/or DS 48.

The server 46 may be connected to DS 48. In one embodiment of the present invention, the DS 48 stores static information and data associated with the mobile devices 20. The information and data may comprise, for example, local device data such as one or more configuration files, software upgrades, or bug fixes, to be sent to the mobile devices 20. The DS 48 comprises a computer-readable medium such as a database or a file system, for example. In embodiments where DS 48 is a database, the servers 46 could access DS 48 for the mobile devices 20 to store and retrieve the local device data. In embodiments where DS 48 is a file system, no such interaction may be required. Instead, the mobile devices 20 could access DS 48 directly to read and write the local device data.

In conventional device management systems, the DM server 50 would have allocated it's own resources and overhead in order to retrieve the device data from DS 48 and send them to the mobile devices 20. With the present invention, however, this responsibility is removed from the DM server 50. Instead, the DM server 50 provides the mobile devices with a REST command (e.g., a GET or PUT command). The mobile devices 20, upon receipt, execute the command to store and/or retrieve the device data to/from DS 48 via the servers 46, or to store and/or retrieve device data directly to/from DS 48.

As stated above, DS 48 is illustrated as a node that is separate from the servers 46 and the DM server 50. However, this is not a requirement of the present invention. The DS 48 is intended to represent all memory that is accessible to the servers 46 and/or the DM server 50. Although this includes databases, file systems, and other such storage systems, it is not limited as such. In one embodiment, DS 48 represents a specially marked portion of internal memory, such as cache, on the server 46 or DM server 50. Storing the information associated with the mobile devices 20 in the cache allows a server 46 to quickly retrieve that data upon receiving a subsequent retrieval command from an appropriate mobile device 20.

The DM server 50 is configured to function as the primary administration and management service for all mobile devices 20. The DM server 50 communicates with existing infrastructure servers, such as GW server 44 and servers 46. Alternatively, as stated previously, the DM server 50 may comprise the functions performed by the server 46 and/or DS 48. The DM server 50, when required, generates the commands necessary to obtain and retrieve certain information and data from DS 48, and provides those commands to the mobile devices 20 for execution. These commands, which are REST commands, are provided to the mobile device 20 over a first communication channel utilizing HTTP/HTTPS.

The mobile device 20 represents a managed device in the network 40 and may be, for example, a cellular telephone, such as a SMARTPHONE, or some other portable communication device. Some exemplary devices include, but are not limited to, satellite phones, Personal Digital Assistants (PDAs), and computing devices such as laptop and notebook computers. According to the present invention, the mobile device 20 receives REST commands from the DM server 50 via the first communication channel, and executes those commands to facilitate device management operations over a second communication channel.

Figure 2:
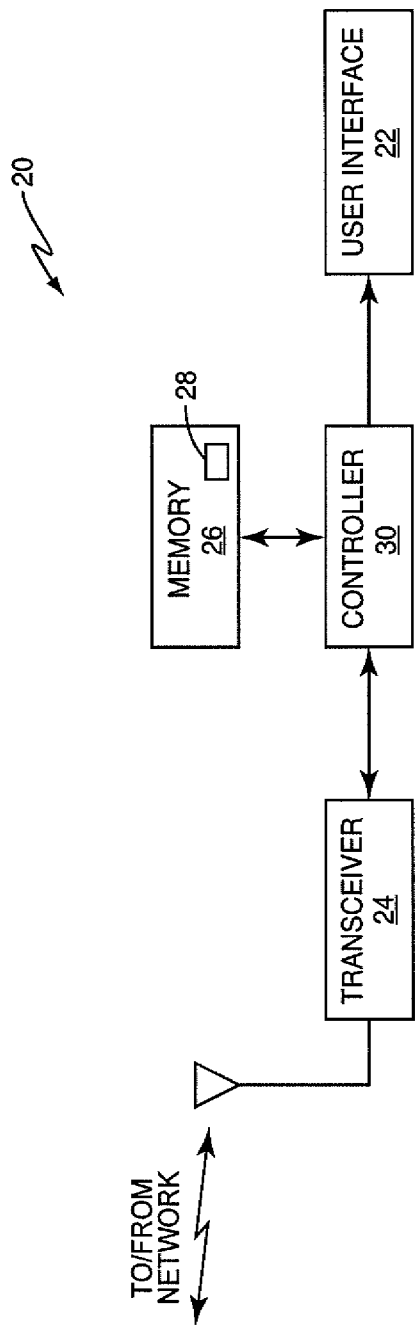
FIG. 2 is a block diagram illustrating some of the component parts of a mobile device configured to function according to one embodiment of the present invention.

FIG. 2 is a block diagram illustrating some of the components of an exemplary managed mobile device 20 configured according to one embodiment of the present invention. As seen in FIG. 2, the mobile device 20 comprises, inter alia, a user interface 22, a communications interface such as a cellular transceiver 24, a memory 26 that stores a DM client agent 28, and a controller 30.

The user interface 22 provides a user with the necessary elements and controls to interact with the mobile device 20. Typically, such elements and controls include, but are not limited to, displays such as a Liquid Crystal Display (LCD) and/or touch-sensitive display, a microphone, a speaker, and a keypad. The function of each of these user interface components is well known in the art and not germane to the present invention. Thus, they are not described in detail here.

The transceiver 24 allows the mobile device 20 to communicate with one or more remote parties via network 40. Additionally, transceiver 24 communicates data and information with the DM server 50. The data and information may comprise REST commands sent by the DM server 50 to be executed by the mobile device 20, or may comprise device data retrieved as a result of the mobile device 20 executing the REST commands. In this embodiment, transceiver 24 comprises a fully functional cellular radio transceiver that can operate according to any known standard, including the standards known generally as the Global System for Mobile Communications (GSM), cdma2000, Universal Mobile Telecommunications System (UMTS), Wideband Code Division Multiple Access (CDMA), 3GPP Long Term Evolution (LTE), and Worldwide Interoperability for Microwave Access (WiMAX).

Memory 26 comprises a computer-readable medium that may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with the controller 30. Memory 26 may store one or more applications, such as DM client agent 28, as well as local device data, such as the device configuration data, for example.

Controller 30 generally controls the overall operation of the mobile device 20 according to programs and instructions stored in memory 26. The controller 30, which may be implemented in hardware, firmware, software, or a combination thereof, may comprise a single microprocessor or multiple microprocessors as needed or desired. The microprocessors may be general purpose microprocessors, digital signal processors, or other special purpose processors.

In one embodiment of the present invention, controller 30 executes the DM client agent 28 to perform device management operations. Particularly, mobile device 20 executes the DM client agent 28 to establish a DM communications session with a corresponding DM server agent 58 executing on DM server 50. Once established, the mobile device 20 receives REST commands from the DM server 50 over a first communication channel. Upon receipt, the mobile device 20 executes the command over a second communication channel to perform different device management operations. For example, the mobile device 20 may execute the received REST command to store device data, such as configuration data, to a server 46 or DS 48. Alternatively, the mobile device 20 may execute the received REST command to retrieve information and/or device data associated with the mobile device 20. Thus, the DM server 50 provides the mobile device 20 with the commands and information it needs to perform device management operations on its own, rather than the DM server 50 performing the device management operations as is conventional, thereby saving network resources.

Figure 3:
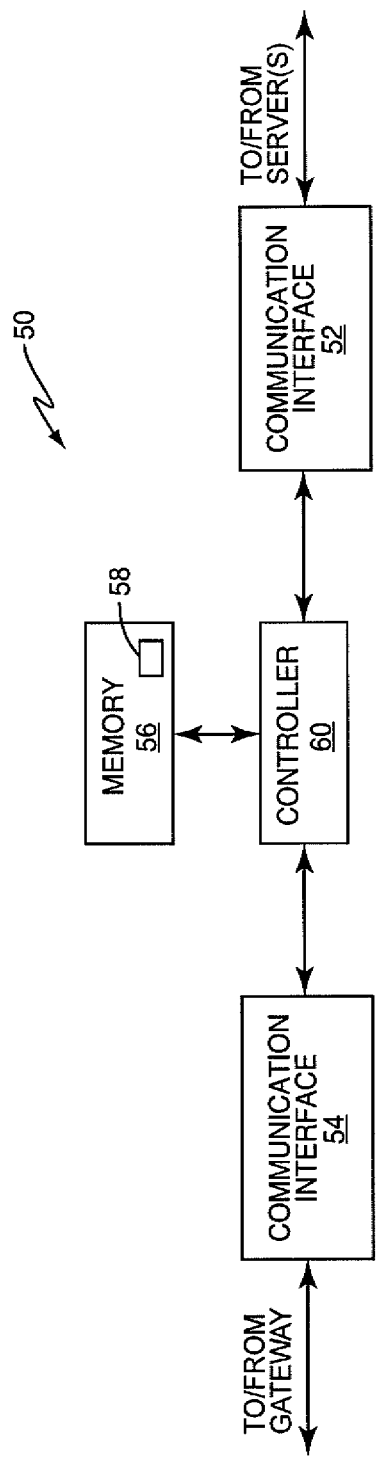
FIG. 3 is a block diagram illustrating some of the component parts of a device management server configured to function according to one embodiment of the present invention.

FIG. 3 is a block diagram illustrating some of the components of an exemplary DM server 50 configured to manage mobile devices 20 according to one embodiment of the present invention. As seen in FIG. 3, the DM server 50 comprises, inter alia, communications interfaces 52, 54, a memory 56 that stores a DM server agent application 28, and a controller 60.

The communication interfaces 52, 54 connect the DM server 50 to the server(s) 46 (interface 52) as well as to the GW server 44 (interface 54). The communication interfaces 52, 54 may comprise, for example, Ethernet ports that connect the DM server 50 to the servers 44, 46. The controller 60 controls the DM server 50 to send and receive data and information over these ports as needed. In embodiments where the DM server 50 and servers 46 comprise a single node, the communication interface 54 need not comprise a hardware port, but instead, may comprise a software construct such as a socket, for example, intended to communicatively connect two or more processes.

Memory 56 comprises a computer-readable medium that may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with the controller 60. According to the present invention, the memory 56 may store one or more applications, such as DM server agent application 58, for execution by the controller 60. The DM server 50 uses the DM server agent 58 to establish a DM communication session with the DM client agent 28 executing on mobile device 20. Under control of the controller 60, the DM server agent 60 generates REST commands for the mobile device 20, and sends them to the mobile device 20 via the established DM session for execution.

Controller 60 generally controls the overall operation of DM server 50 according to programs and instructions stored in memory 56. The controller 60, which may be implemented in hardware, firmware, software, or a combination thereof, may comprise a single microprocessor or multiple microprocessors as needed or desired. The microprocessors may be general purpose microprocessors, digital signal processors, or other special purpose processors.

As previously stated, device management is the process by which a network operator, for example, manages different devices on the network. Device management operations include, but are not limited to, the setting of initial local device data (e.g., configuration information) for a managed device, the subsequent updating of that local device data on the managed device, as well as the retrieval of the local device data from a managed device and storage on a network server. Additionally, Device management operations may also include the monitoring and processing of events and/or alarm conditions that are generated by the managed devices. With respect to this latter operation, the device management operations may be invoked responsive to detecting such conditions. For example, detecting a certain error condition or alarm for a managed device at a DM device management server may trigger the server to send the managed device updated firmware or updated configuration data to fix the detected condition.

Conventionally, a device management server is responsible for performing these operations for the managed mobile devices. However, the present invention extends this functionality using REST commands to allow the managed device to perform at least some of the device management functions itself. Particularly, in one embodiment, the DM client agent 28 and the DM server agent 58 establish a DM communication session between them. Either the DM client agent 28 or the DM server agent 58 may initiate the session. Once established, the DM server agent 58 sends a generated REST command to the mobile device 20 for performing a device management function. Upon receipt, the DM client agent 28 executes the received command on the mobile device to perform the management function.

The DM agents may operate according to any known standard to initiate and manage the DM session. However in one embodiment, the DM client agent 28 and the DM server agent 58 operate in compliance with standards authored by the Open Mobile Alliance (OMA). One exemplary standard is entitled "Enabler Release Definition for OMA Device Management" (i.e., OMA-ERELD-DM-V1_2_1-20080617-A) is authored and maintained by the OMA. The approved version of that document, version 1.2.1, was released on Jun. 17, 2008. This "Enabler Release" document, which is incorporated in its entirety herein by reference, provides a list of references in section 5 that identifies the approved specification documents for various areas of OMA Device Management according to the version 1.2.1. Each of those documents are also incorporated herein by reference in their entirety. Of course, the DM agents of the present invention are not limited to this particular version of the OMA DM standard, but rather, may be configured to operate according to later versions of the OMA DM standard that have yet to be released.

Figure 4:
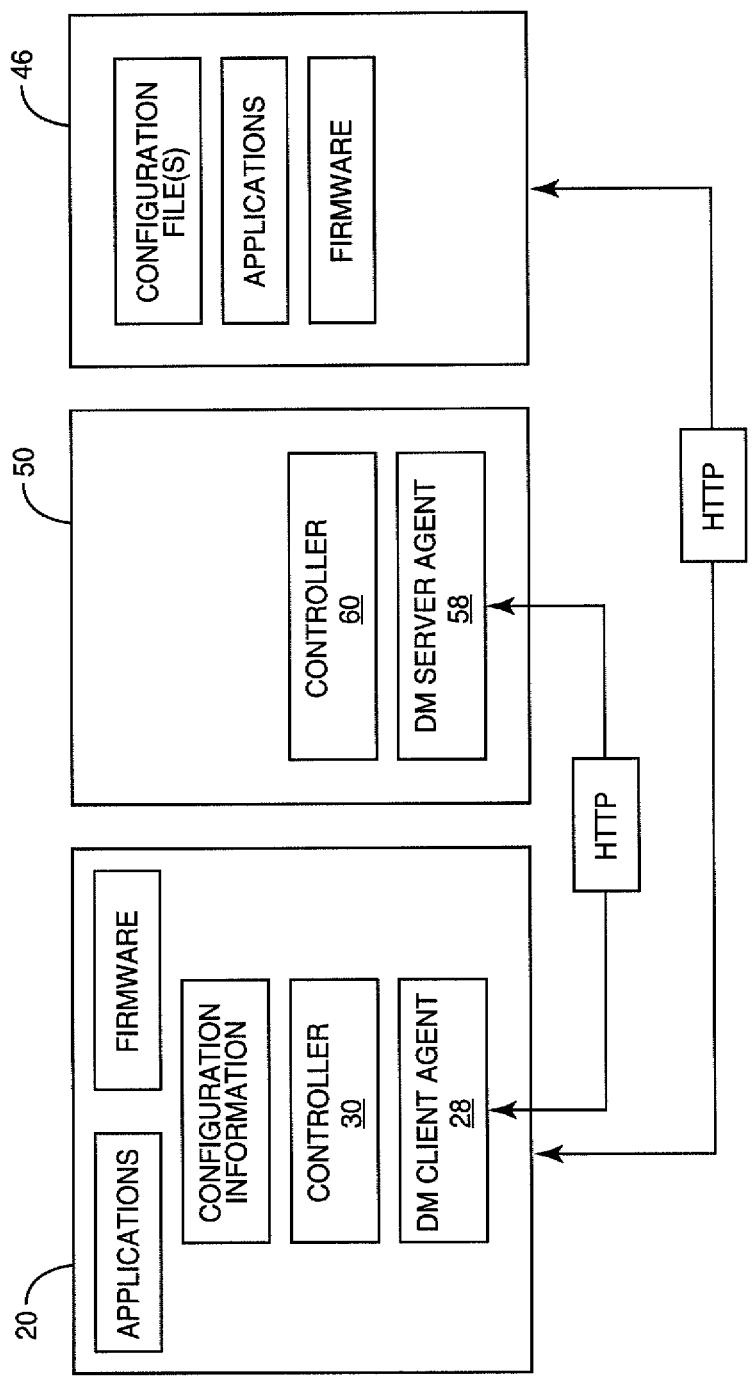
FIG. 4 is a block diagram illustrating some communication interfaces over which the mobile devices communicate information and data with the device management server and the servers according to one embodiment of the present invention.

FIG. 4 is a block diagram illustrating how a managed device, such as mobile device 20, communicates with the DM server 50 to perform this functionality according to one embodiment of the present invention. As seen in FIG. 4, the managed mobile device 20 includes the DM client agent 28 executed by controller 30, as well as a variety of local device data including, but not limited to, applications, firmware, and configuration information. The DM server 50 also includes the DM server agent 58 executed by controller 60. Together, the agents 28, 58 can establish a DM communication session and communicate data and commands to one another over a first communication channel using the HyperText Transfer Protocol (HTTP/HTTPS). For example, in one embodiment of the present invention, the DM server agent 58 provides a REST command to be executed by the mobile device 20 to retrieve local device data stored at server 46 in network 40. In another embodiment, the DM server agent 58 provides a different REST command to the mobile device 20, which executes the commands required to send and store local device data to server 46. The managed mobile device 20 then executes the received REST command, and either sends or receives the resultant data, depending on the particular REST command, to/from the server 46 over a second communication channel using HTTP/HTTPS.

The REST commands generated according to the present invention may include a number of parameters. Further, the number and type of those parameters may differ based on the particular REST command being generated. For example, REST commands typically include one or two Uniform Resource Indicators (URIs). A first URI (i.e., URI1) may be used to identify a location on the DM server 50 or server 46 or DS 48. A second URI (i.e., URI2) may be used to identify a location on the local mobile device 20. Using these URIs, as well as some other parameters, the DM server 50 is able to provide the mobile device 20 with the commands and the parameters it needs to perform the device management functions.

For example, to allow a mobile device 20 to retrieve device data (e.g., configuration settings) from server 46, the DM server might, in one embodiment, generate and send the following REST command to the mobile device 20 for execution having the following format.

GET <URI1> where <URI1> indicates the location of the device data on the server 46.

Similarly, to allow the mobile device 20 to retrieve the device data and then store it in local memory 26, the DM server 50 might generate and send a command having the following format.

GET <URI1> <URI2> where <URI1> indicates the location of the device data on the server 46, and <URI2> indicates the location in memory 26 to store the device data retrieved from <URI1>. This may be used, for example, to cause a mobile device to load/re-load some specific configuration settings, and then replace or overwrite the same settings in the local memory 26. To cause the mobile device 20 to upload specific data to the server 46, the DM server could generate and send a command having the following format to the mobile device 20.

PUT <URI1> <URI2> or POST <URI1> <URI2>

With the POST command, the mobile device 20 would retrieve the data at the location indicated by <URI2> and send it to <URI1> for storage. The PUT command would cause the mobile device 20 to perform the same function, but in addition, the DM Server 50 or DS 48 would replace or overwrite any device data that may already be stored at <URI1>.

In addition to the URIs, the DM server 50 may also generate other parameters to provide to the mobile device 20 with the REST commands. However, rather than provide the mobile device 20 with the actual values for the parameters, the DM server 50 would provide the mobile device 50 with "labels" that function as place holders for the values. Upon receipt, the mobile device 20 would simply replace the "place holder" parameter label with the actual value of the parameter before executing the command. Such parameters are generated into the URI and include, but are not limited to, the commands listed in the following table.

TABLE 1

| PARAMETER | MEANING |
| --- | --- |
| MNC | Mobile Network Code |
| MCC | Mobile Country Code |
| CMNC | Current Mobile Network Code |
| CMCC | Current Mobile Country Code |
| IMEI | International Mobile Equipment Identity |
| IMSI | International Mobile Subscriber Identity |

The actual values for the parameters, in most cases, are stored in the local memory 26 of the mobile device 20, or taken from information stored on some computer readable memory associated with and/or accessible to the mobile device, such as a Subscriber Information Module (SIM) associated with the mobile device 20.

Other parameters that may be included in the REST commands sent to the mobile device could specify to the mobile device 20 an amount of device data to retrieve from, or store to, the server 46. Specifically, the device data is stored on the server 46/DS 48 in a hierarchical tree structure. One parameter in particular, i.e., the <levels> parameter, could specify to the mobile device 20 how many levels deep into the tree structure at <URI2> that the mobile device 20 should retrieve and send to the server 46/DS 48. An exemplary REST command might be formatted as follows.

POST <URI1> <URI2> <levels>

With this command, the mobile device 20 would retrieve n levels of the tree structure located on the mobile device 20 at <URI2>, and send that retrieved device data to the server 46/DS 48 located at <URI1>. Only the specified n levels of device data would be replaced at <URI1>.

Figure 5:
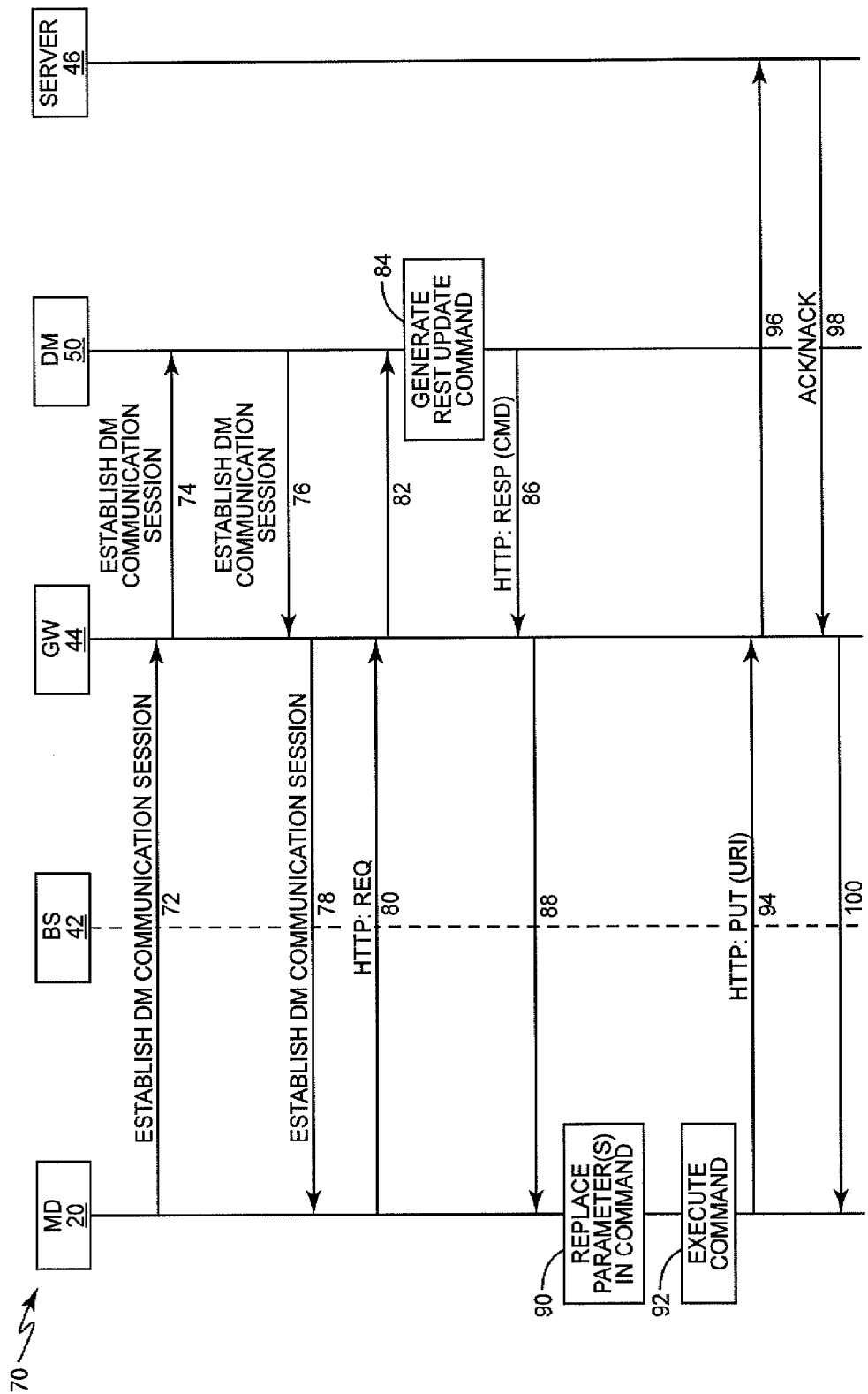
FIG. 5 is a call flow diagram illustrating a call flow with which a mobile device may upload and store information and data to the servers according to one embodiment of the present invention.
Figure 6:
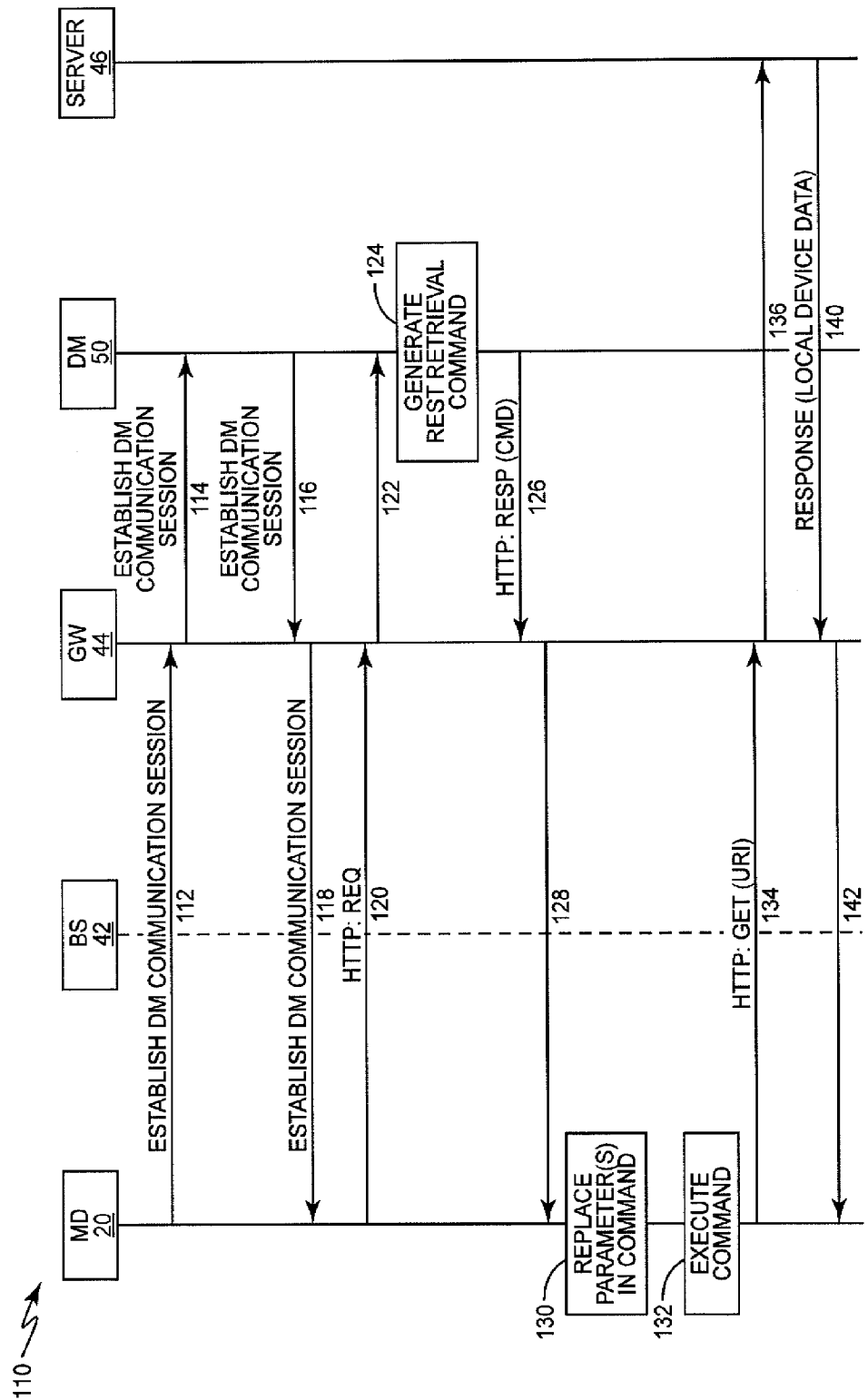
FIG. 6 is a call flow diagram illustrating a call flow with which a mobile device may retrieve information and data from the servers according to one embodiment of the present invention.

FIGS. 5 and 6 are signal diagrams that illustrate how DM server 50 generates and sends REST commands to the mobile device 20 for execution at mobile device 20. Particularly, FIG. 5 is a signal diagram illustrating a method by which a managed mobile device 20 can update a server 46 with its local device data according to one embodiment of the present invention. As seen in FIG. 5, method 70 begins when the mobile device 20 and the DM server 50 establish a DM communication session between them (lies 72-78). In one embodiment, the signaling and messages used to set up the DM communication session are performed in compliance with the Transmission Control Protocol (TCP) standard identified in the document entitled RFC:793. This document, which is authored and maintained by the Defense Advanced Research Projects Agency (DARPA), is dated September, 1981, and is incorporated herein by reference in its entirety. Either the mobile device 20, or the DM server 50, can initiate the DM session. Once the session has been established, the mobile device 20 sends a HTTP/HTTPS request message to the DM server 50 (lines 80-82) to generate a REST update command. The DM server 50 generates the REST update command (box 84), and sends the command in an HTTP/HTTPS response message to the mobile device 20 (lines 86-88).

The REST update command may be, for example, an HTTP PUT command, and may include different parameters, one or more of which must be replaced by the mobile device 20 before it executes the command. For example, the DM server 50 may generate the following REST command.

PUT company.server.com/settings/[IMEI]/mms local.device.com/settings/mms
where: <URI1> is "company.server.com/settings/ [IMEI]/mms" and <URI2> is "local.device.com/settings/x10i/mms."

As previously stated, <URI1> identifies the location on server 46 where the mobile device 20 should send the local device data to be stored. The other parameter, <URI2>, identifies the location at the local mobile device 20 where the mobile device 20 should obtain the information to store at <URI1>. Other parameters that might be included with the command to mobile device 20 include, but are not limited to, the type of mobile device 20 and/or a unique ID to identify the mobile device 20 to the server 46.

Upon receiving the REST update command (line 88), the mobile device 20 parses the command to identify the variables it must replace, and replaces them with actual values (box 90). In this case, the mobile device 20 replaces the parameter [IMEI] with its actual value, which may be stored in local memory 26, for example. The mobile device 20 may also receive and replace the parameters for mobile device type and mobile ID. The mobile device 20 then executes the command (box 92) (i.e., HTTP/HTTPS PUT) to send the local device data identified by <URI2> to the server location identified by <URI1> (line 94). Upon receipt (line 96), the server 46 that was identified by <URI1> will store the received local device data in memory. In some cases, the server 46 may provide the sending mobile device 20 with an acknowledgement, or a negative acknowledgement, indicating whether the server 46 was able to store the data successfully (lines 98-100).

FIG. 6 is a signal diagram illustrating a method 110 in which the mobile device retrieves local device data according to one embodiment of the present invention. Method 110 begins when the mobile device 20, or the DM server 50, establishes the DM communication session (lines 112-118). As above, the signaling and messages used to set up the DM communication session between the DM client agent 28 and the DM server agent 58 are performed in compliance with the TCP standards. Once the session has been established, the mobile device 20 sends a HTTP/HTTPS request message to the DM server 50 (line 120-122). Upon receipt, the DM server 50 generates a REST retrieve command (box 124) and sends the command in the HTTP/HTTPS response to the mobile device 20 (lines 126-128). For example, the generated command may be:

GET company.server.com/settings/[MCC]/[MNC]/mms
where: <URI1> is "company.server.com/settings/[MCC]/[MNC]/mms.

With this GET command, <URI1> identifies the location on server 46 from where the mobile device 20 should retrieve the local device data. The type of mobile device 20 and/or a unique ID to identify the mobile device 20 to the server 46, may also be provided as parameters.

Before the mobile device 20 executes the REST GET command, the mobile device 20 will replace the [MCC] and [MNC] parameters with actual values (box 130). The mobile device 20 then executes the REST GET command (box 132) (e.g., HTTP/HTTPS GET) to retrieve the local device data identified by <URI1> (lines 134-138). The server 46 that was identified by <URI1> will obtain the received local device data from memory (e.g., from cache or from DS 48), and send it to the mobile device 20 (lines 140-142). Upon receipt of the device data, the mobile device 20 can update its own device data at location <URI2>.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing mobile devices in a wireless communication network, the method comprising:
   establishing a device management (DM) communication session with a mobile device responsive to detecting an alert condition associated with the mobile device;
   generating, at a device management server, a Representational State Transfer (REST) command for execution at the mobile device
      that, when executed by the mobile device, allows the mobile device to communicate device data associated with the mobile device with a network server, the REST command comprising:
a first Uniform Resource Indicator (URI) identifying a location on the network server having the device data associated with the mobile device, and including one or more parameters to be replaced by the mobile device with corresponding values prior to the mobile device executing the REST command; and
sending the REST command from the device management server to the mobile device via a first communication channel associated with the DM session.

2. The method of claim 1 wherein generating a REST command comprises generating a REST update command to be executed by the mobile device to upload and store the device data associated with the mobile device onto the network server over a second communication channel.

3. The method of claim 1 wherein generating a REST command comprises generating a REST retrieve command to be executed by the mobile device to retrieve the device data associated with the mobile device from the network server over a second communication channel.

4. The method of claim 1 wherein generating the REST command comprises generating the REST command to further include a second URI identifying a location on the mobile device to store the device data retrieved from the first URI.

5. The method of claim 1 wherein the device data associated with the mobile device comprises configuration information for the mobile device.

6. A device management server for managing mobile devices in a wireless communication network, the server comprising:
memory to store a Device Management (DM) agent; and
a controller configured to execute the DM agent to:
establish a DM communication session with a mobile device responsive to detecting an alert condition associated with the mobile device;
generate a Representational State Transfer (REST) command for execution at the mobile device
that, when executed by the mobile device, allows the mobile device to communicate device data associated with the mobile device with a network server, the REST command comprising:
a first Uniform Resource Indicator (URI) identifying a location on the network server where the device data associated with the mobile device is stored, and including one or more parameters to be replaced by the mobile device with corresponding values prior to the mobile device executing the REST command; and
send the REST command to the mobile device over a first communication channel via a first communication channel associated with the established DM session.

7. The server of claim 6 wherein the generated REST command comprises a REST update command to be executed by the mobile device to upload and store the device data associated with the mobile device onto the network server over a second communication channel.

8. The server of claim 6 wherein the generated REST command comprises a REST retrieve command to be executed by the mobile device to retrieve the device data associated with the mobile device from the network server over a second communication channel.

9. The server of claim 6 wherein the controller is configured to generate the REST command to further include a second URI that identifies a location on the mobile device to store the device data retrieved from the first URI.

10. The server of claim 6 wherein the device data associated with the mobile device comprises configuration information for the mobile device.

11. The server of claim 6 wherein the DM agent comprises an Open Mobile Alliance (OMA) DM server agent.

12. The server of claim 6 wherein the server and the network server comprise a single node.

13. A method for managing mobile devices in a wireless communication network, the method comprising:
establishing a Device Management (DM) communication session between a mobile device and a device management server;
receiving a Representational State Transfer (REST) command from the device management server via a first communication channel associated with the DM communication session, the REST command comprising:
a first Uniform Resource Indicator (URI) identifying a location for the device data on a network server, and including one or more parameters that are to be replaced by the mobile device with corresponding values prior to executing the REST update command;
replacing the one or more parameters in the first URI at the mobile device with the corresponding values prior to executing the REST update command; and
executing the REST command at the mobile device to communicate device data associated with the mobile device with the network server.

14. The method of claim 13 wherein receiving and executing the REST command comprises:
receiving, at the mobile device, a REST update command over the first communication channel; and
executing the REST update command at the mobile device to upload and store the device data to the network server over a second communication channel.

15. The method of claim 13 wherein receiving and executing the REST command comprises:
receiving, at the mobile device, a REST retrieve command over the first communication channel; and
executing the REST retrieve command at the mobile device to retrieve the device data from the network server over a second communication channel.

16. The method of claim 13 wherein the REST command received from the device management server further comprises a second URI that identifies a location on the mobile device to store the device data retrieved from the first URI.

17. The method of claim 14 wherein the device data associated with the mobile device comprises configuration information for the mobile device.

18. The method of claim 14 wherein establishing the DM communication session comprises initiating communications with the data management server to establish the DM communication session.

19. A mobile device in a wireless communications network, the mobile device comprising:
a transceiver configured to establish a Device Management (DM) session with a device management server; and
a controller configured to:
receive a Representational State Transfer (REST) command from the device management server via a first communication channel associated with the DM session, the REST command comprising:
a first Uniform Resource Indicator (URI) identifying a location for the device data on the network server, and including one or more parameters that are to be replaced by the mobile device with corresponding values prior to executing the REST command;

replace the one or more parameters in the first URI with the corresponding values prior to executing the REST command; and execute the REST command to communicate device data associated with the mobile device with the network server over a second communication channel.

20. The mobile device of claim 19 wherein the controller is configured to:

receive a REST update command from the device management server over the first communication channel; and execute the REST update command to upload and store the device data associated with the mobile device over the second communication channel to the network server.

21. The mobile device of claim 19 wherein the controller is configured to:

receive a REST retrieve command from the device management server over the first communication channel; and execute the REST retrieve command to retrieve the device data associated with the mobile device over the second communication channel from the network server.

22. The mobile device of claim 19 wherein the received REST command further comprises a second URI that identifies a location for the device data on the mobile device.

23. The mobile device of claim 19 wherein the device data associated with the mobile device comprises configuration information for the mobile device.

24. The mobile device of claim 19 wherein the controller is further configured to initiate establishing the DM communication session.

* * * * *